United States Patent
Sallam (10) Patent No.: US 8,474,039 B2
(45) Date of Patent: Jun. 25, 2013

(54) SYSTEM AND METHOD FOR PROACTIVE DETECTION AND REPAIR OF MALWARE MEMORY INFECTION VIA A REMOTE MEMORY REPUTATION SYSTEM

(75) Inventor: Ahmed Said Sallam, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 378 days.

(21) Appl. No.: 12/695,011

(22) Filed: Jan. 27, 2010

(65) Prior Publication Data

US 2011/0185424 A1 Jul. 28, 2011

(51) Int. Cl.
*H04L 29/06* (2006.01)
(52) U.S. Cl.
USPC ............................................. 726/22; 726/23
(58) Field of Classification Search
USPC ........................................................ 726/22
See application file for complete search history.

(56) References Cited

U.S. PATENT DOCUMENTS

| | | | | |
|---|---|---|---|---|
| 5,440,723 A | 8/1995 | Arnold et al. | ................ | 395/181 |
| 5,826,013 A | 10/1998 | Nachenberg | ................ | 395/186 |
| 6,973,578 B1 | 12/2005 | McIchionc | ................ | 713/200 |
| 7,069,589 B2 | 6/2006 | Schmall et al. | ................ | 726/24 |
| 7,725,941 B1 | 5/2010 | Pavlyushchik | ................ | 726/24 |
| 7,730,040 B2 | 6/2010 | Reasor et al. | ................ | 707/690 |
| 7,765,481 B2 | 7/2010 | Dixon et al. | ................ | 715/738 |
| 7,788,359 B2 | 8/2010 | Lund et al. | ................ | 709/223 |
| 7,890,627 B1 | 2/2011 | Thomas | ................ | 709/224 |
| 8,001,606 B1 | 8/2011 | Spertus | ................ | 726/25 |
| 2002/0066024 A1* | 5/2002 | Schmall et al. | ................ | 713/200 |
| 2003/0009482 A1 | 1/2003 | Benerjee et al. | ................ | 707/200 |
| 2006/0031483 A1 | 2/2006 | Lund et al. | ................ | 709/224 |
| 2006/0101277 A1 | 5/2006 | Meenan et al. | ................ | 713/182 |
| 2006/0130141 A1* | 6/2006 | Kramer et al. | ................ | 726/23 |
| 2006/0137012 A1 | 6/2006 | Aaron | ................ | 726/24 |
| 2006/0206713 A1* | 9/2006 | Hickman et al. | ................ | 713/176 |
| 2006/0294592 A1 | 12/2006 | Polyakov et al. | ................ | 726/24 |
| 2007/0006308 A1 | 1/2007 | Desouza et al. | ................ | 726/24 |
| 2007/0130351 A1 | 6/2007 | Alperovitch et al. | ................ | 709/229 |
| 2007/0162587 A1 | 7/2007 | Lund et al. | ................ | 709/223 |

(Continued)

FOREIGN PATENT DOCUMENTS

GB 2466922 7/2010

OTHER PUBLICATIONS

United States Patent Application; U.S. Appl. No. 12/694,960; pp. 36, Jan. 27, 2010.

(Continued)

*Primary Examiner* — William Goodchild
(74) *Attorney, Agent, or Firm* — Baker Botts L.L.P.

(57) ABSTRACT

A method for detecting malware memory infections includes the steps of scanning a memory on an electronic device, determining a suspicious entry present in the memory, accessing information about the suspicious entry in a reputation system, and evaluating whether the suspicious entry indicates a malware memory infection. The memory includes memory known to be modified by malware. The suspicious entry is not recognized as a safe entry. The reputation system is configured to store information on suspicious entries. The evaluation is based upon historical data regarding the suspicious entry.

33 Claims, 4 Drawing Sheets

U.S. PATENT DOCUMENTS

| | | | |
|---|---|---|---|
| 2007/0214151 A1 | 9/2007 | Thomas et al. | 707/10 |
| 2007/0250927 A1 | 10/2007 | Naik et al. | 726/22 |
| 2008/0016339 A1 | 1/2008 | Shukla | 713/164 |
| 2008/0082662 A1 | 4/2008 | Dandliker et al. | 709/225 |
| 2008/0133540 A1 | 6/2008 | Hubbard et al. | 707/10 |
| 2008/0178288 A1 | 7/2008 | Alperovitch et al. | 726/22 |
| 2008/0189788 A1 | 8/2008 | Bahl | 726/25 |
| 2008/0244744 A1 | 10/2008 | Thomas et al. | 726/23 |
| 2008/0244748 A1 | 10/2008 | Neystadt et al. | 726/25 |
| 2009/0044276 A1* | 2/2009 | Abdel-Aziz et al. | 726/24 |
| 2009/0070878 A1 | 3/2009 | Wang et al. | 726/24 |
| 2009/0077664 A1 | 3/2009 | Hsu et al. | 726/24 |
| 2009/0083852 A1* | 3/2009 | Kuo et al. | 726/22 |
| 2009/0187991 A1 | 7/2009 | Freericks et al. | 726/24 |
| 2009/0282476 A1 | 11/2009 | Nachenberg et al. | 726/22 |
| 2010/0058468 A1 | 3/2010 | Green et al. | 726/22 |
| 2010/0192222 A1 | 7/2010 | Stokes et al. | 726/22 |
| 2011/0107423 A1* | 5/2011 | Kolar Sunder et al. | 726/24 |
| 2011/0209219 A1 | 8/2011 | Zeitlin et al. | 726/23 |
| 2011/0209222 A1 | 8/2011 | Sharp et al. | 726/26 |

OTHER PUBLICATIONS

Unites States Office Action; U.S. Appl. No. 12/694,960; pp. 19, Mar. 5, 2012.

United States Patent Application; U.S. Appl. No. 12/694,988; pp. 38, Jan. 27, 2010.

Unites States Office Action; U.S. Appl. No. 12/694,988; pp. 25, Apr. 18, 2012.

United States Patent Application; U.S. Appl. No. 12/840,032; pp. 42, Jul. 20, 2010.

Unites States Office Action; U.S. Appl. No. 12/840,032; pp. 21, Jul. 6, 2012.

United States Patent Application; U.S. Appl. No. 12/695,005; pp. 56 Jan. 27, 2010.

Unites States Office Action; U.S. Appl. No. 12/695,005; pp. 37, Apr. 19, 2012.

United States Patent Application; U.S. Appl. No. 12/874,700; pp. 25, Sep. 2, 2010.

* cited by examiner

SYSTEM AND METHOD FOR PROACTIVE DETECTION AND REPAIR OF MALWARE MEMORY INFECTION VIA A REMOTE MEMORY REPUTATION SYSTEM

TECHNICAL FIELD OF THE INVENTION

The present invention relates generally to computer security and malware protection and, more particularly, to a method and system for proactive detection and repair of malware memory infection via a remote memory reputation system.

BACKGROUND

Memory based malware infections on computers and other electronic devices are very intrusive and hard to detect and repair. For example, the design of the personal computer ("PC") architecture, particularly the design of the Memory Management Unit, does not provide a straightforward facility to trap when memory is being written. One approach today is to mark all protected memory as read-only, and then catch the exception generated when something attempts to write to the memory. Such a technique has several shortcomings. It is conducted on a per-memory-page basis, meaning that the granularity of the technique cannot be conducted on blocks of memory less than 4 kilobytes, the size of a typical memory page. It is limited by the operating system virtual memory management unit, and changing such a unit is not supported by commercial operating systems. The technique downgrades the system performance, as an exception is thrown every time memory is written. It is also difficult to tell if an infection is associated with malicious operation or not.

Malware may include, but is not limited to, spyware, rootkits, password stealers, spam, sources of phishing attacks, sources of denial-of-service-attacks, viruses, loggers, Trojans, adware, or any other digital content that produces unwanted activity.

SUMMARY

A method for detecting malware memory infections includes the steps of scanning a memory on an electronic device, determining a suspicious entry present in the memory, accessing information about the suspicious entry in a reputation system, and evaluating whether the suspicious entry indicates a malware memory infection. The memory includes memory known to be modified by malware. The suspicious entry is not recognized as a safe entry. The reputation system is configured to store information on suspicious entries. The evaluation is based upon historical data regarding the suspicious entry.

In a further embodiment, an article of manufacture includes a computer readable medium and computer-executable instructions. The computer-executable instructions are carried on the computer readable medium. The instructions are readable by a processor. The instructions, when read and executed, cause the processor to scan a memory on an electronic device, determine a suspicious entry present in the memory, access information about the suspicious entry in a reputation system, and evaluate whether the suspicious entry indicates a malware memory infection. The memory comprising memory is known to be modified by malware. The suspicious entry is not recognized as a safe entry. The reputation system is configured to store information on suspicious entries. The evaluation is based upon historical data regarding the suspicious entry.

In yet another embodiment, a system for detecting malware memory infections includes a monitor and a reputation system. The monitor is configured to scan a memory on an electronic device, determine a suspicious entry present in the memory, and send information about the suspicious entry to the reputation system. The memory includes memory known to be modified by malware. The suspicious entry is not recognized as a safe entry. The reputation system is configured to access information about the suspicious entry in a reputation database and evaluate whether the suspicious entry indicates a malware memory infection. The reputation database is configured to store information on suspicious entries. The evaluation is based upon historical data regarding the suspicious entry. The monitor and reputation system are communicatively coupled.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
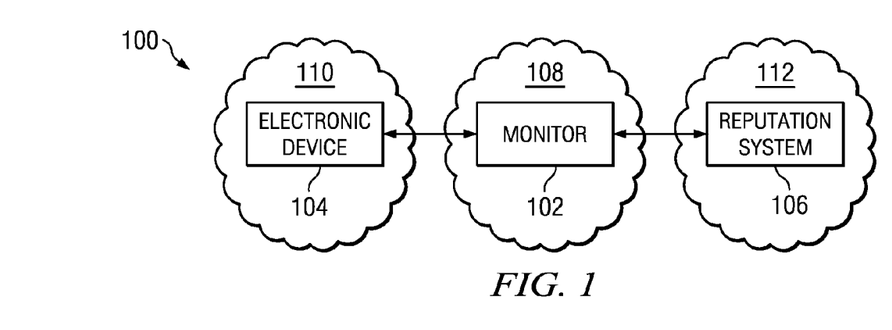
FIG. 1 is an illustration of an example system for defeating malware memory infections.

FIG. 1 is an illustration of an example system 100 for defeating malware memory infections. System 100 may comprise a monitor 102, an electronic device 104, and a reputation server 106. Monitor 102 may be configured to scan electronic device 104 for suspicious memory modifications. Monitor 102 may be configured to communicate with reputation server 106 to determine whether the suspicious memory modifications comprise a malware infection. Reputation server 106 may be configured to evaluate the suspicious memory modifications, generate a repair, and monitor 102 may be configured to receive and enact the evaluation and repair from reputation server 106.

In one embodiment, monitor 102 may be configured to operate in a cloud computing scheme. Monitor 102 may comprise software that resides on network 108, and may be loaded and executed on a machine in network 108. Monitor may be communicatively coupled to electronic device 104 through network 108 or any other suitable network or communication scheme. Monitor may scan electronic device 104 without executing on electronic device 104. Monitor 102 may be communicatively coupled to reputation server 106 through network 108, network 112, or both. The reputation server 106 may comprise a server on network 112. In one embodiment, monitor 102 and reputation server 106 may reside on the same network. In one embodiment, monitor 102 and reputation server 106 may reside on the same hardware.

In one embodiment, monitor 102 may reside on electronic device 104. Monitor 102 may be loaded and executed on electronic device 104. Monitor 102 may be communicatively coupled to reputation server 106 through network 112, or any other suitable network or communication scheme.

Networks 108, 110, 112 may comprise any suitable networks for communication between electronic device 104, monitor 102, and reputation server 106. Such networks may include but are not limited to: the Internet, an intranet, wide-area-networks, local-area-networks, back-haul-networks, peer-to-peer-networks, or any combination thereof.

Electronic device 104 may comprise any device configurable to interpret and/or execute program instructions and/or process data, including but not limited to: a computer, desktop, server, laptop, personal data assistant, or smartphone.

Figure 2:
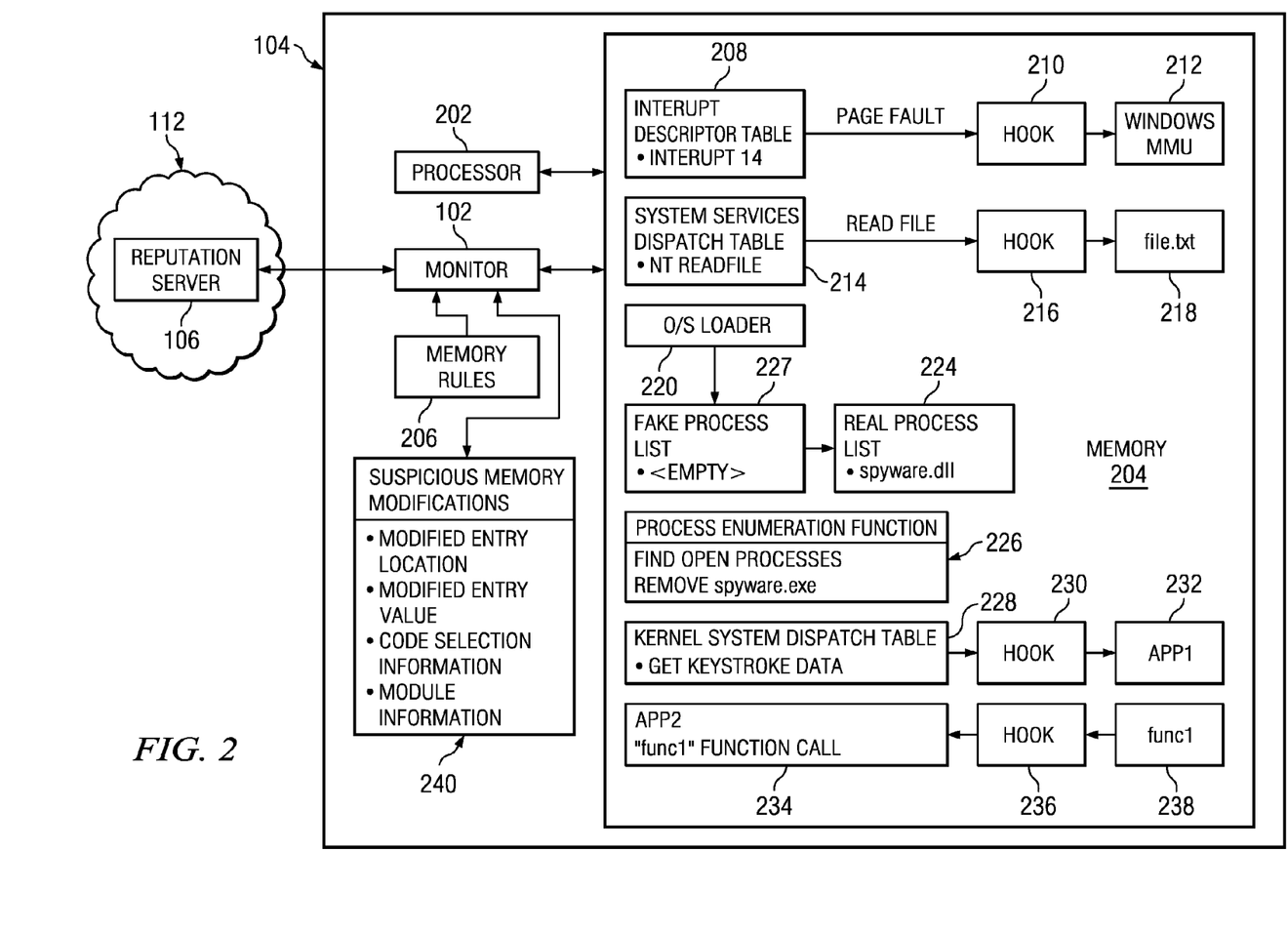
FIG. 2 is an illustration in further detail of some portions of the system that scan an electronic device for suspicious memory modifications.

FIG. 2 is an illustration in further detail of some portions of the system 100 that scan an electronic device 104 for suspicious memory modifications. Monitor 102 may be configured to scan memory 204 to compile suspicious memory modifications 240 that may comprise memory modifications made by malware, and report suspicious memory modifications 240 to reputation servers 106. Electronic device 104 may comprise a processor 202 coupled to a memory 204. Monitor 102 may reside on electronic device 104, or on any other electronic device, server, or other suitable mechanism to scan electronic device 104 for suspicious memory modifications. Monitor 102 may comprise any application, process, script, module, executable, server, executable object, library, or other suitable digital entity. Monitor 102 may be communicatively coupled to reputation server 106 over network 112. Monitor 102 may be configured to reside in memory 204 for execution by processor 202 with instructions contained in memory 204.

Processor 202 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 202 may interpret and/or execute program instructions and/or process data stored in memory 204. Memory 204 may be configured in part or whole as application memory, system memory, or both. Memory 204 may include any system, device, or apparatus configured to hold and/or house one or more memory modules. Each memory module may include any system, device or apparatus configured to retain program instructions and/or data for a period of time (e.g., computer-readable media).

Monitor 102 may be configured to run on electronic device 104. Monitor may be implemented in an application, process, shared library, executable, module, script, function, or any other suitable technique for carrying out the functions described in the present disclosure.

Monitor 102 may be configured to utilize memory rules 206 to determine whether modifications in memory 204 are suspicious. Memory rules 206 may comprise any technique for monitor 102 to determine that a suspicious memory modification is in memory 204. Memory rules 206 may be implemented by any suitable technique for indicating to monitor 102 suitable rules for scanning a memory for suspicious memory modifications, including but not limited to: logic, instructions, a shared library, application, function, module, database, table, list, or other data structure or executable. In one embodiment, monitor 102 may comprise some functions, data, or configurations of memory rules 206. Memory rules 206 may be configured to be a dynamic set of memory rules. In one embodiment, memory rules 206 may be configured to be updated by monitor 102, by reputation server 106, or by a combination of both.

Memory rules 206 may comprise a list of data, data spaces and/or other data entities in memory 204 that are known to be modified by malware. Memory rules 206 may also comprise data values for such places and/or entities that indicate safe or, conversely, unsafe values. Memory rules 206 may also comprise a logical rule for interpreting the data found at the data space. For example, where a pointer points to in memory may be modified by malware. A web browser application may utilize add-on widgets, implemented via a browser helper object that points to a shared library. In one embodiment, memory rules 206 may comprise indications that such a pointer should point to known locations. Memory rules 206 may comprise a list of known shared libraries that are safe and do not comprise malware. If the monitor 102 determines that the pointer points to an unknown shared library, the pointer may comprise a suspicious memory modification. In another embodiment, memory rules 206 may comprise a rule that the pointer should only point to shared libraries registered by the web browser application. If the monitor 102 determines that the pointer points to a shared library not registered by the web browser application, the pointer may comprise a suspicious memory modification.

Memory rules 206 may comprise a list of code, or other portions of system executables in memory 204 that are known to be modified by malware. For example, memory rules 206 may comprise a logical rule that the code section of a particular shared library loaded into memory 204 should match the image of the code section of the same shared library as it exists in stored memory. If monitor 102 discovered the particular shared library in memory 204, monitor 102 may be configured to compare the image of the code section of the shared library against an image of the shared library on disk. If the images are different, monitor 102 may be configured to determine that the difference comprises a suspicious memory modification. In one embodiment, memory rules 206 may provide information against which monitor 102 may compare discovered images. Returning to the above example, memory rules 206 may comprise a hash of the known image of the code section of a shared library, against which monitor 102 may be configured to compare discovered shared libraries from memory 204.

Monitor 102 may be configured to scan memory 204 for modifications that are suspicious because they may have been made by malware, based on memory rules 206. Monitor 102 may scan any portion of memory 204 known to be modified by malware.

In one embodiment, monitor 102 may be configured to examine an interrupt descriptor table 208 in memory 204 for suspicious memory modifications. Interrupt descriptor table 208 may comprise a list of interrupts that may be used by elements of electronic device 104. For example, interrupt 14 may be used by the Windows Memory Management Unit 212 to handle page faults. Based on known values in memory rules 206, monitor 102 may be configured to determine whether a memory hook 210 is intercepting page fault interrupts. Memory hook 210 may be detected based on, for example, a change in the pointers of the interrupt table entry. The presence of memory hook 210 may not be known to be safe, according to memory rules 206, and thus monitor 102 may be configured to determine that memory hook 210 is suspicious.

In one embodiment, monitor 102 may be configured to examine kernel data structures in memory 204 for suspicious memory modifications. For example, a system services dispatch table 214 may comprise a service function for "NT readfile" for reading files such as "file.txt" 218. Monitor 102 may be configured to apply a memory rule 206 to determine that data structures involved in calling the function are different than indicated in a memory rule 206. The difference may indicate a hook 216 intercepting the returned data from reading files such as "file.txt" 218. The presence of the hook 216 is not recognized as safe in a memory rule 206, and thus monitor 102 may be configured to determine that the memory modification is suspicious.

In one embodiment, monitor 102 may be configured to examine user mode data structures in memory 204 for suspicious memory modifications. For example, an operating system loader 220 may reference a list of active processes. Monitor 102 may be configured to examine the data structure used to implement the list of active processes. Monitor 102 may be configured to apply a memory rule 106 that indicates operating system loader 220 is expected to reference a particular data structure such as actual process list 224. If operating system loader 220 references instead another list, such as altered process list 227, monitor 102 may be configured to determine that the memory modification is suspicious.

In one embodiment, monitor 102 may be configured to examine arbitrary memory code sections, data sections, or pages in memory 204 for suspicious memory modifications. For example, a modification to the code section 226 of a function such as one for process enumeration may contain a modification to skip or modify the operation of crucial features. The process enumeration function may normally be operable to determine the processes operating on electronic device 104. A modification of the code of the function may be usable by malware to hide a malicious running process, by inserting code to skip a scan of the malicious process's location. In another example, a modification of the code of the function may be modified to change the data returned from scanning memory for processes. If the code section 226 of the function is not recognized, monitor 102 may be configured to determine that such a memory modification is suspicious.

In one embodiment, monitor 102 may be configured to examine kernel mode system dispatch table entries for suspicious memory modifications. For example, an entry in the kernel system dispatch table 228 obtaining keystroke data may be modified to point to a memory hook 230. Monitor 102 may be configured to apply a memory rule 106 that indicates the function is expected to point to an application such as "APP1" 232 running on electronic device 102. If the function points to an unrecognized location, monitor 102 may be configured to determine that such a memory modification is suspicious.

In one embodiment, monitor 102 may be configured to examine user mode function names and related hosting modules in memory 204 for suspicious memory modifications. For example, an application such as "APP2" 234 may be an application running on electronic device 104. APP2 234 may normally be the hosting module for a function "fun1" 238. Instead of returning information to APP2 234, Fund 1 may return information to a memory hook 236. Monitor 102 may be configured to apply a memory rule 106 that indicates the function is expected to point to an application such as APP1 234. If the function points to an unrecognized location, monitor 102 may be configured to determine that such a memory modification is suspicious.

Monitor 102 may be configured to summarize the suspicious memory modifications in a table 240 of suspicious memory modifications. Table 240 of suspicious memory modifications may be implemented by a table, list, database, file, or any other suitable data structure for storing information concerning the suspicious memory modifications determined by monitor 102. Table 240 of suspicious memory modifications may be configured to store identifying information concerning a given suspicious memory modification, including but not limited to: the modified entry's location, the modified entry's value, information about the code section pointed to by a pointer, or information about module pointed to by a pointer.

Monitor 102 may be configured to communicate with reputation server 106 to determine whether suspicious memory modifications in electronic device 104 comprise malware infections. In one embodiment, monitor 102 may be configured to transmit table 240 of suspicious memory modifications to reputation server 106. Monitor 102 may be configured to receive an indication of whether the memory modifications comprise malware from reputation server 106. Reputation server 106 may be configured to determine whether a given memory modification comprises a malware infection or not.

Monitor 102 may be configured to protect electronic device 104 based on information that one or more suspicious memory modifications that are known to comprise malware infection. Monitor 102 may be configured to protect electronic device 104 in any means suitable to repair a malware memory infection. Monitor 102 may be configured to protect electronic device 104 by repairing the memory affected by the suspicious memory modification to a known safe state. In one embodiment, monitor 102 may be configured to receive instructions for repairing memory 204 from reputation server 106. In another embodiment, monitor 102 may be configured to apply a repair driver received from reputation server 106, or from another suitable source upon instruction from reputation server 106. Monitor 102, or a suitable repair driver, may be configured to repair double or quad word memory areas by using a locked memory exchange operation. Monitor 102 or a suitable repair driver may also be configured to use any appropriate technique for repairing memory 204 of malware memory infections. In one embodiment, monitor 102 may be configured to use the Codean library, used by the utility known as Root Detective, to examine user mode code sections, as well as the import and export sections of shared libraries. In another embodiment, monitor 102 may be configured to use a feature of the McAfee Anti-Virus system known as common shell, allowing monitor 102 to read and write to kernel memory. In such an embodiment, monitor 102 may be configured to call the common shell directly.

Monitor 102 may be configured to conduct a scan of electronic device at any suitable time for detecting suspicious memory modifications. In one embodiment, monitor 102 may be configured to conduct such a scan and subsequent repair as part of seeking a particular rootkit. In another embodiment, monitor 102 may be configured to conduct such a scan and subsequent repair during normal analysis of drivers. In yet another embodiment, monitor 102 may be configured to conduct such a scan and subsequent repair as part of the analysis for a new malware object. Monitor 102 may be configured to optimize its scanning for these embodiments such that a full scan does not occur upon the creation of every new file. For example, the monitor 102 may be configured to scan a single new process when that new process is launched. In another example, monitor 102 may be configured to scan kernel memory when a new driver is launched.

Figure 3:
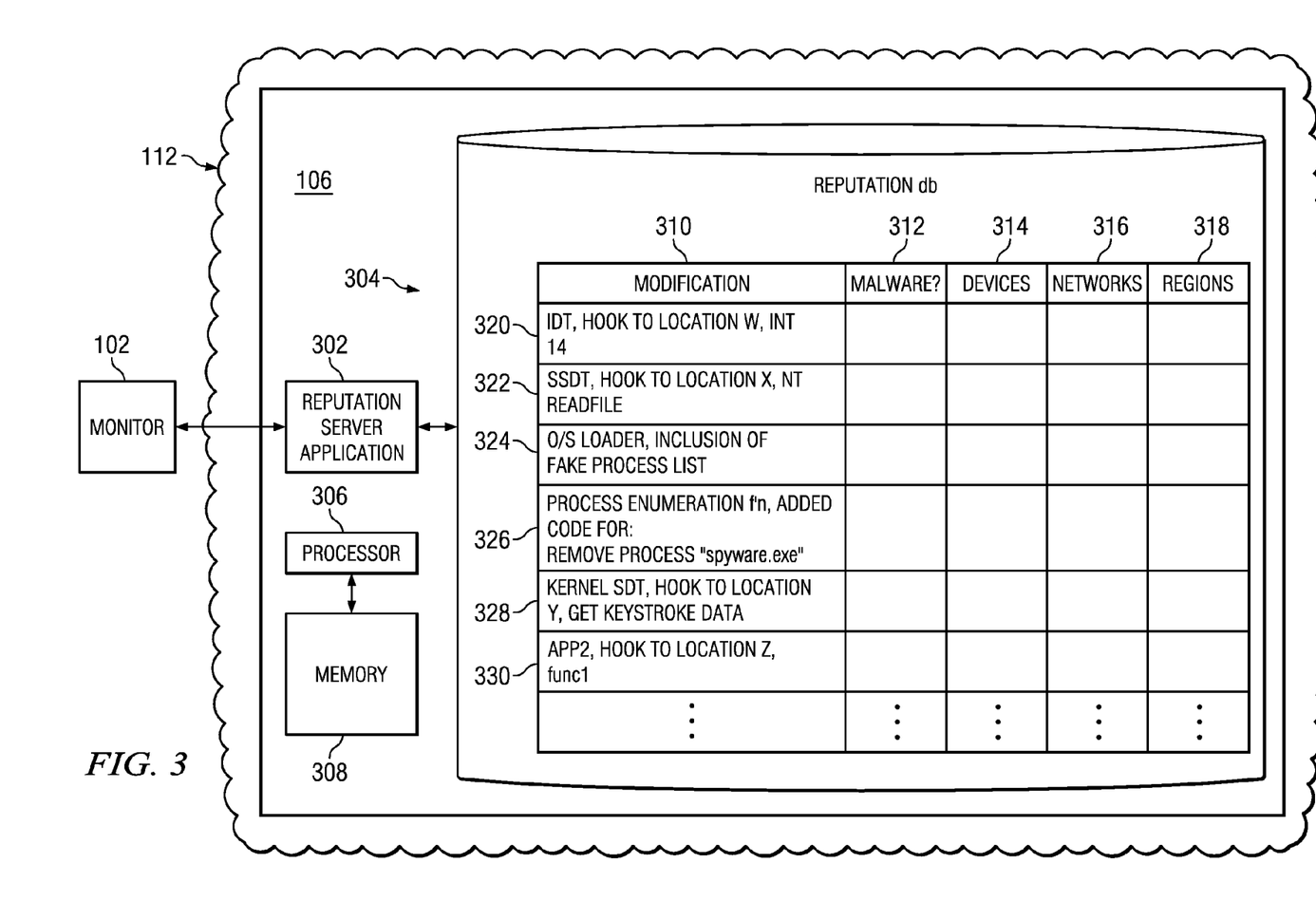
FIG. 3 is an illustration of an example reputation server for tracking memory modifications according to the memory modifications' propensity to comprise malware.

FIG. 3 is an illustration of an example reputation server 106 for tracking memory modifications according to the memory modifications' propensity to comprise malware. Reputation server 106 may comprise a reputation server application 302, a reputation database 304, and a processor 306 coupled to a memory 308. Reputation server application 302 may be configured to communicate with monitor 102 and reputation database 304 to track memory modifications to determine whether the memory modifications comprise malware.

Reputation server application 302 may comprise any application, process, script, module, executable, server, executable object, library, or other digital entity suitable to interface monitor 102 and reputation database 304 to track the reputation of memory modifications according to the memory modifications' propensity to host malware. Reputation server application 302 may reside on reputation server 106, or on any other suitable server to track the reputation of memory modifications according to the memory modifications' propensity to comprise a malware memory modification. Reputation server application 302 may be communicatively coupled to monitor 102. In one embodiment, reputation server application 302 may be communicatively coupled to monitor 102 over network 112. Reputation server application 302 may communicatively coupled to reputation database 304. In one embodiment, application 302 may be communicatively coupled to reputation database 102 over network 114. In one embodiment, reputation server application 302 and monitor 102 may be co-located within the same device, application, server, or process. In one embodiment, reputation server application 302 and monitor 102 may comprise functions, modules, libraries, or portions of the same application, server, or process. In such an application, some features or functions of reputation server application 302 and monitor 102 may be redundant, and thus combined. Reputation server application 302 may be configured to perform particular functions or configurations of monitor 102, and vice-versa, where possible. In one embodiment, monitor 102 may be configured to reside on reputation server 106, in memory 308 for execution by processor 306 with instructions contained in memory 308.

Processor 306 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 306 may interpret and/or execute program instructions and/or process data stored in memory 308. Memory 308 may be configured in part or whole as application memory, system memory, or both. Memory 308 may include any system, device, or apparatus configured to hold and/or house one or more memory modules. Each memory module may include any system, device or apparatus configured to retain program instructions and/or data for a period of time (e.g., computer-readable media).

Reputation server application 302 may be configured to receive information from monitor 102 concerning one or more suspicious memory modifications present on electronic device 104. Information from monitor 102 concerning suspicious memory modifications on electronic device 104 may comprise the identities of one or more memory modifications. Reputation server application 302 may be configured to access data contained within reputation database 304 to determine whether or not the suspicious memory modification comprises a malware infection. In one embodiment, reputation server application 302 may receive a specific indication from reputation database 304 that a particular memory modification comprises a malware infection. In one embodiment, reputation server application 302 may receive information from reputation database 304 about a particular memory modification's propensity to comprise a malware infection, which reputation server application 302 must use to determine whether to indicate to monitor 102 that the particular memory modification is safe or known to comprise malware. Reputation server application 302 may be configured to indicate to monitor 102 whether one or more particular memory modifications are known to comprise a malware memory modification.

Reputation server application 302 may be configured to populate information in reputation database 304 based upon information received from monitor 102. Reputation server application 302 may be configured to populate reputation database 304 with information associated with a particular memory modification, such as that in table 240 of suspicious memory modifications. Reputation server application 302 may also be configured to populate reputation database 304 with information concerning the electronic device 104 for which the information is reported, as well as the network 110 on which electronic device 104 resides. Reputation server application 302 may be configured to determine, based upon the network 110 or upon other information, the region or other general geographic location of electronic device 104. For example, electronic device 104 may reside on a network 110 that reputation server application may determine is located in France, or generally in Western Europe.

If no entry for a given memory modification exists in reputation database 304, reputation server application 302 may be configured to create an entry for the given memory modification in reputation database 304. Reputation server application 302 may be configured to give a new entry in reputation database 304 default values. Reputation server application may be configured to associate a new entry in reputation database 304 with an existing entry.

Reputation database 304 may comprise information associating one or more memory modifications and the memory modifications' propensity to be associated with or host malware. Reputation database 304 may be configured to be accessible to provide such information. In one embodiment, reputation database may be configured to be accessible by use of database queries from reputation server application 302. Reputation database 304 may reside on reputation server 106. Reputation database 304 may reside in memory 308, or another such memory. Reputation database 304 may be configured in any manner suitable for providing information associating one or more memory modifications and the memory modifications' propensity to comprise a malware infection. Reputation database 304 may be implemented in a database, file, record, module, library, or any other suitable mechanism. Reputation database 304 may contain any number of entries 320-330 for various memory modifications. Reputation database 304 may comprise one or more categorizations, classifications and/or evaluations of particular memory modifications in regards to the memory modifications' association with malware. In one embodiment, each entry in reputation database 304 may comprise a memory modification field 310, an indication of known association with malware field 312, a known infected devices field 314, a known infected networks field 316, and/or a known infected regions field 318. In other embodiments, each entry in reputation database may comprise additional fields suitable to identify, classify, or evaluate a memory modification.

Memory modification field 310 may be configured to indicate the memory modification for which data is stored in reputation database 304. Memory modification field 310 may comprise any suitable information by which a memory modification may be stored, sorted, queried, and/or identified. Memory modification field 310 may comprise information including but not limited to: a modified memory location, modified memory value, information about the code section pointed to by a pointer, and/or information about module pointed to by a pointer. Memory modification field 310 may also comprise a digital signature, hash, or other unique identifier for identifying a memory modification. Monitor 102 or reputation server application 106 may be configured to create such a unique identifier for a given memory modification.

Indication of known association with malware field 312 may comprise a field indicating whether or not a memory modification is known to be associated with malware, and/or is known to be safe. In one embodiment, indication of known association with malware field 312 may be implemented by a "whitelist" and/or a "blacklist." A whitelist may comprise a list of memory modifications which are known to be safe, and that do not comprise a malware memory infection. A blacklist may comprise a list of memory modifications which are known to comprise malware. In such an embodiment, indication of known association with malware field 312 may be empty, or contain an indication that it is not known whether a memory modification comprises malware or is safe. In one embodiment, indication of known association with malware field 312 may comprise additional information of the specific or kinds malware with which a memory modification is associated.

Known infected devices field 314 may comprise information about the quantity and/or identity of devices for which a given memory modification has been reported. Known infected devices field 314 may be implemented in any suitable manner for indicating the quantity or identity of such devices. In one embodiment, known infected devices field 314 may be implemented by a record of all devices for which a given memory modification has been reported. In another embodiment, known infected devices field 314 may be implemented by an indication of the number of different devices for which a given memory modification has been reported. Known infected devices field 314 may also contain an indication of the time in which the memory modification was reported.

Similarly, known infected networks field 316 may comprise information about the quantity and/or identity of networks for which a given memory modification has been reported. In one embodiment, known infected networks field 316 may be configured to derive information from the known infected devices field 314, indicating networks upon which such devices reside. Known infected networks field 316 may comprise information arising from a particular network node, a domain, subdomain, or any combination thereof. In one embodiment, known infected networks field 316 may use internet protocol ("IP") addresses and/or host names. For example, a device with the IP address "255.255.255.255" and the host name "example1.example2.com" may have been reported as having a given memory modification. In a reputation database 304 entry for the given memory modification, the known infected network field 316 may comprise information about the memory modification according to "255.255.255.255," "255.255.255.*", and/or "255.255.*" wherein "*" indicates all the nodes of a given subnet mask. Similarly, known infected network field 316 may comprise information about the memory modification according to "example1.example2.com", and/or "*.example2.com." Known infected networks field 316 may be implemented in any suitable manner for indicating the quantity or identity of such devices. In one embodiment, known infected networks field 316 may be implemented by a record of all networks for which a given memory modification has been reported. In another embodiment, known infected networks field 316 may be implemented by an indication of the number of different networks for which a given memory modification has been reported. Known infected networks field 316 may also contain an indication of the time in which the memory modification was reported.

Similarly, known infected regions field 318 may comprise information about the quantity and/or identity of geographical regions for which a given memory modification has been reported. In one embodiment, known infected regions field 318 may be configured to derive information from the known infected devices field 314 and/or known infected networks field 316, indicating the geographical regions for which a given memory modification has been reported. For example, a device with a particular IP address may have reported a memory modification. The country of origin of the device (France, for example) may be determined from IP address and stored in known infected regions field 318. In another example, a region broader than nation of origin may be stored in known infected regions field 318, such as "Western Europe." In one embodiment, known infected regions field 318 may be implemented by a record of all networks for which a given memory modification has been reported. In another embodiment, known infected regions field 318 may be implemented by an indication of the number of different networks for which a given memory modification has been reported. Known infected regions field 318 may also contain an indication of the time in which the memory modification was reported.

Reputation server application 302 may be configured to query reputation database 304 to receive information about a particular memory modification. The information about a particular memory modification may comprise a distribution pattern of the memory modification. Reputation database 304 may be configured to return information for a particular memory modification that was queried. Reputation server application 302 may use any suitable criteria to determine whether a memory modification comprises a malware infection or not.

In one embodiment, reputation database 304 may be configured to return an indication that the memory modification comprises a malware infection. In a further embodiment, the indication may be derived from the presence of the memory modification in a blacklist contained within field 314. In another embodiment, reputation database 304 may be configured to return an indication that the memory modification does not comprise a malware infection. In a further embodiment, the indication may be derived from the presence of the memory modification in a whitelist contained within field 314. In yet another further embodiment, reputation database may store such a whitelist or blacklist in a location other than field 314. In yet another embodiment, reputation server application 302 may be configured to examine a whitelist or blacklist directly to obtain information whether or not a given memory modification comprises a malware infection.

If a memory modification is not specifically indicated in reputation database 304 as either safe or malware, then reputation server application 302 may be configured to determine the malware status of the memory modification from other information in reputation database 304. Reputation server application 302 may be configured to then populate the reputation database 304 with information about a given memory modification, such as described above or in table 240 of suspicious memory modifications. Reputation server application 302 may be configured to utilize any suitable criteria to determine whether information from reputation database 304 shows that an undetermined memory modification comprises a malware infection or not.

To determine whether a memory modification comprises a malware infection or not, reputation server application 302 may be configured to take into account the distribution pattern of the memory modification. In one embodiment, the distribution pattern of a memory modification may be determined from information such as those in known infected devices field 314, known infected networks field 316, and/or known infected regions field 318.

In one embodiment, reputation server application 302 may be configured to analyze information such as fields 314-318 to find that a particular memory modification has been reported on thousands of devices on thousands of domains in a short amount of time. In such an embodiment, reputation server application 302 may be configured to determine that the memory modification does not comprise a malware infection. Similarly, reputation server application 302 may be configured that a memory modification reported on thousands of devices on many different geographical regions (for example, North America, western Europe, and east Asia) does not comprise a malware infection. Any suitable threshold of installations in a given time frame or on a given number of domains may be selected, corresponding to a distribution pattern of a safe memory modification.

In one embodiment, reputation server application 302 may be configured analyze information such as fields 314-318 to find that a particular memory modification has been installed on different devices from the same domain. In such an embodiment, reputation server application 302 may be configured to determine that the memory modification does not comprise malware. Any suitable threshold of installations in a given time frame or on a given number of domains may be selected, corresponding to a distribution pattern of a safe memory modification.

In one embodiment, reputation server application 302 may be configured to information such as fields 314-318 to find that a particular memory modification has been encountered a relatively few number of times on different devices, but on a wide number of different domains, or groups of internet addresses, over a relatively long period of time. In such an embodiment, reputation server application 302 may be configured to determine that such a memory modification comprises malware. Any suitable threshold of instances in a given time frame or on a given number of domains may be selected, corresponding to a distribution pattern of a memory modification comprising malware. In one embodiment, five different instances of the memory modifications from five different domains, in more than one region may comprise a malware infection.

If reputation server application 302 determines that a give memory modification comprises a malware infection, reputation server application 302 may be configured to create, designate, or assemble a repair driver to send to monitor 102 for repairing the memory of electronic device 104. Reputation server application 302 may be configured to create, designate, or assemble any suitable repair driver for repairing electronic device 102. The repair driver may comprise a script, executable, shared library, or other executable function. Monitor 102 may be configured to apply the repair driver to electronic device 104. Reputation server application 302 may be configured to send any suitable indication, instruction, or information to monitor 102 to notify 102 that a given memory modification comprises malware, or conversely, that a given memory modification does not comprise malware. In the event that it is determined that a given memory modification does or does not comprise malware, reputation server application 302 may be configured to update reputation database 304 with the evaluation.

In operation, in FIGS. 1-3 a monitor 102 may be operating to scan electronic device 104 for suspicious memory modifications that may comprise malware. Monitor 102 may communicate with reputation server 106 to determine whether memory modifications present on electronic device 104 comprise malware. Reputation server 106 may evaluate the suspicious memory modifications, generate a repair, and monitor 102 may receive and enact the evaluation and repair from reputation server 106.

Monitor 102 may be running on a cloud computing scheme. Monitor 102 may be operating on a machine in network 108. Monitor 102 may be operating on electronic device 104. Monitor 104 may be operating on a machine in network 110. Reputation server 106 may be running on a machine in network 110. Reputation server 106 and monitor 104 may be running on the same machine.

Monitor 102 may scan memory 204 to compile a table 240 of suspicious memory modifications that may comprise memory modifications made by malware, and report table 240 of suspicious memory modifications 240 to reputation servers 106. Monitor 102 may include information such as the modified entry's location, the modified entry's value, information about the code section pointed to by a pointer, information about module pointed to by a pointer, and identifying information about the electronic device, its network, and/or region.

Monitor 102 may utilize memory rules 206 to determine whether modifications in memory 204 are suspicious. In one embodiment, memory rules 206 may be updated by monitor 102, by reputation server 106, or by a combination of both. Monitor 102 may apply any memory rule 206 suitable to identify a suspicious memory modification. Monitor 102 may be configured to compare the image of a code section of a system executable in memory 204 against a known image of the code section. Monitor 102 may compare expected values in memory 204 against known values in memory rules 206. Monitor 102 may scan portions of memory 204 known to be modified by malware.

In one embodiment, monitor 102 may examine an interrupt descriptor table 208 in memory 204 for suspicious memory modifications. For example, the presence of the memory hook 210 for an interrupt may not be known to be safe, according to memory rules 206, and thus monitor 102 may determine that memory hook 210 is suspicious.

In one embodiment, monitor 102 may examine kernel data structures in memory 204 for suspicious memory modifications. For example, the presence of a hook 216 intercepting the returned data from reading files may not be recognized as safe, thus monitor 102 may determine that the memory modification is suspicious.

In one embodiment, monitor 102 may examine user mode data structures in memory 204 for suspicious memory modifications. For example, if an operating system loader 220 loads an unrecognized data structure such as altered process list 227, monitor 102 may determine that the memory modification is suspicious.

In one embodiment, monitor 102 may examine arbitrary memory code sections, data sections, or pages in memory 204 for suspicious memory modifications. For example, if a modification to the code section 226 of a function is not recognized, monitor 102 may determine that such a memory modification is suspicious.

In one embodiment, monitor 102 may examine kernel mode system dispatch table entries for suspicious memory modifications. For example, if an entry in the kernel system dispatch table 228 is pointing to an unrecognized location, monitor 102 may be configured to determine that such a memory modification is suspicious.

In one embodiment, monitor 102 may be configured to examine user mode function names and related hosting modules in memory 204 for suspicious memory modifications. For example, if a function points to an unrecognized location, monitor 102 may be configured to determine that such a memory modification is suspicious.

Monitor 102 may conduct a scan of electronic device at any suitable time for detecting suspicious memory modifications. In one embodiment, monitor 102 may conduct such a scan and subsequent repair as part of seeking a particular rootkit. In another embodiment, monitor 102 may conduct such a scan and subsequent repair during normal analysis of drivers. In yet another embodiment, monitor 102 may conduct such a scan and subsequent repair as part of the analysis for a new malware object. Monitor 102 may optimize its scanning for these embodiments such that a full scan does not occur upon the creation of every new file. For example, the monitor 102 may scan a single new process when that new process is launched. In another example, monitor 102 may scan kernel memory when a new driver is launched.

Monitor 102 may summarize the suspicious memory modifications in a table 240 of suspicious memory modifications. Monitor 102 may communicate with reputation server 106 to determine whether suspicious memory modifications in electronic device 104 comprise malware infections. In one embodiment, monitor 102 may transmit table 240 of suspicious memory modifications to reputation server 106. Monitor 102 may receive an indication of whether the memory modifications comprise malware from reputation server 106. Reputation server 106 may determine whether a given memory modification comprises a malware infection or not.

Reputation server application 302 may communicate with monitor 102 and reputation database 304 to track memory modifications to determine whether the memory modifications comprise malware. Reputation server application 302 may perform particular functions or configurations of monitor 102, and vice-versa, where possible. In one embodiment, monitor 102 may be running on reputation server 106, in memory 308 for execution by processor 306 with instructions contained in memory 308.

Reputation server application 302 may receive information from monitor 102 concerning one or more suspicious memory modifications present on electronic device 104. Reputation server application 302 may access data contained within reputation database 304 to determine whether or not the suspicious memory modification comprises a malware infection. In one embodiment, reputation server application 302 may receive a specific indication from reputation database 304 that a particular memory modification comprises a malware infection. In one embodiment, reputation server application 302 may receive information from reputation database 304 about a particular memory modification's propensity to comprise a malware infection, which reputation server application 302 must use to determine whether to indicate to monitor 102 that the particular memory modification is safe, or known to comprise malware. Reputation server application 302 may indicate to monitor 102 whether one or more particular memory modifications are known to host malware.

Reputation server application 302 may populate information in reputation database 304 based upon information received from monitor 102. Reputation server application 302 may populate reputation database 304 with information associated with a particular memory modification, such as that in table 240 of suspicious memory modifications. Reputation server application 302 may also populate reputation database 304 with information concerning the electronic device 104 for which the information is reported, as well as the network 110 on which electronic device 104 resides. Reputation server application 302 may determine, based upon the network 110 or upon other information, the region or other general geographic location of electronic device 104. For example, electronic device 104 may reside on a network 110 that reputation server application may determine is located in France, or generally in Western Europe.

If no entry for a given memory modification exists in reputation database 304, reputation server application 302 may create an entry for the given memory modification in reputation database 304. Reputation server application 302 may give a new entry in reputation database 304 default values. Reputation server application may associate a new entry in reputation database 304 with an existing entry.

Reputation database 304 may provide one or more categorizations, classifications and/or evaluations of particular memory modifications in regards to the memory modifications' association with malware. Reputation server application 302 may access information for a given memory modification including known association with malware field 312, known infected devices field 314, known infected networks field 316, and/or known infected regions field 318. Monitor 102 or reputation server application 106 may create a unique identifier for a given memory modification reflected in field 310.

Reputation server application 302 may query reputation database 304 to receive information about a particular memory modification. Reputation database 304 may return information for a particular memory modification that was queried. Reputation server application 302 may use any suitable criteria to determine whether a memory modification comprises a malware infection or not, based on the results returned from reputation database 304.

In one embodiment, reputation database 304 may return an indication that the memory modification comprises a malware infection. In another embodiment, reputation database 304 may return an indication that the memory modification does not comprise a malware infection. In yet another embodiment, reputation server application 302 may examine a whitelist or blacklist directly to obtain information whether or not a given memory modification comprises a malware infection.

To determine whether a memory modification comprises a malware infection or not, reputation server application 302 may take into account the information in known infected devices field 314, known infected networks field 316, and/or known infected regions field 318.

In one embodiment, reputation server application 302 may analyze information such as fields 314-318 to find that a particular memory modification has been reported on thousands of devices on thousands of domains in a short amount of time. In such an embodiment, reputation server application 302 may determine that the memory modification does not comprise a malware infection.

In one embodiment, reputation server application 302 may be configured analyze information such as fields 314-318 to find that a particular memory modification has been installed on different devices from the same domain. In such an embodiment, reputation server application 302 may determine that the memory modification does not comprise malware.

In one embodiment, reputation server application 302 may information such as fields 314-318 to find that a particular memory modification has been encountered a relatively few number of times on different devices, but on a wide number of different domains, or groups of internet addresses. In such an embodiment, reputation server application 302 may determine that such a memory modification comprises malware.

If reputation server application 302 determines that a given memory modification comprises a malware infection, reputation server application 302 may send a repair driver to monitor 102 for repairing the memory of electronic device 104. In one embodiment, reputation server application 302 may send an indication to monitor 102 that the given memory modification comprises a malware infection. In a further embodiment, the reputation server application 302 will also include instructions for monitor 102. In the event that it is determined that a given memory modification does or does not comprise malware, reputation server application 302 may update reputation database 304 with the evaluation.

Monitor 102 may protect electronic device 104 based on information that one or more suspicious memory modifications comprises malware infections. Monitor 102 may protect electronic device 104 by repairing the memory affected by the suspicious memory modification to a known safe state. In one embodiment, monitor 102 may receive instructions for repairing memory 204 from reputation server 106. In another embodiment, monitor 102 may apply a repair driver received from reputation server 106, or from another suitable source upon instruction from reputation server 106, to repair the memory modification.

Figure 4:
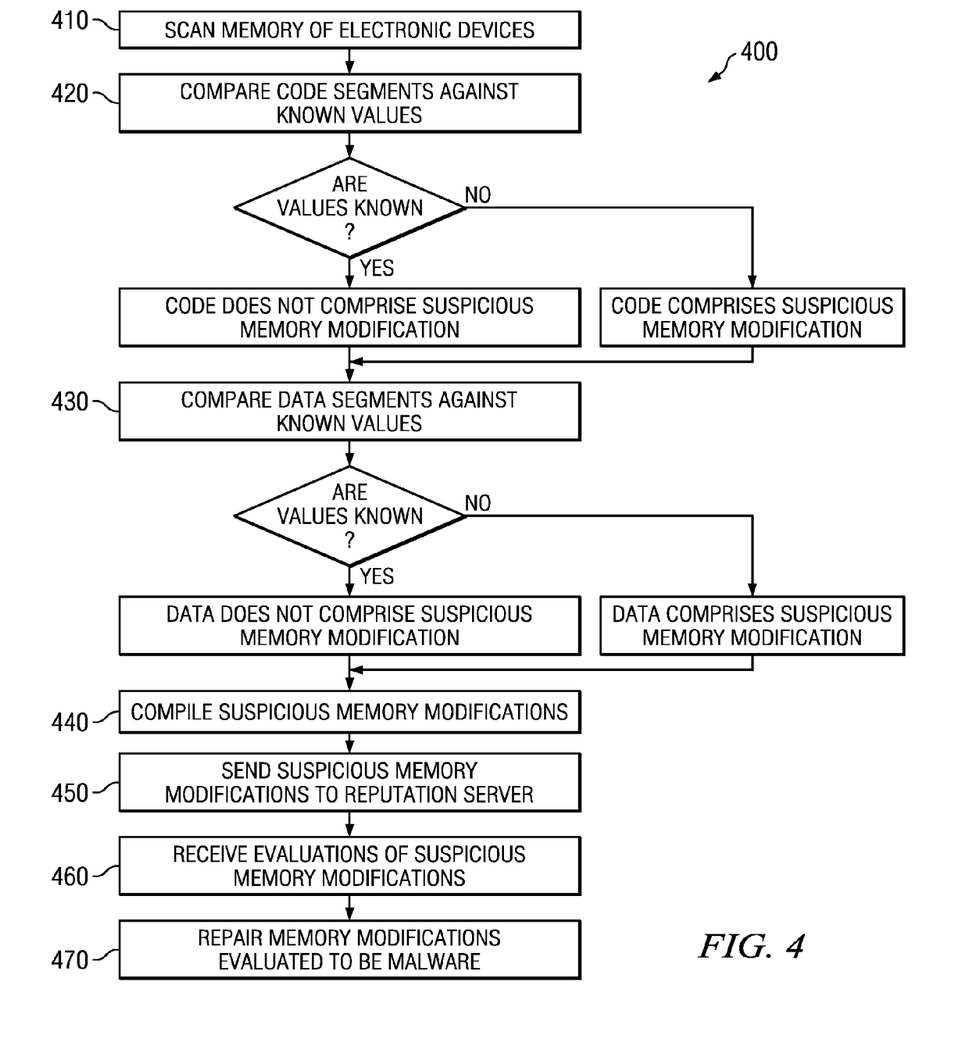
FIG. 4 is an illustration of example method to detect and repair suspicious memory modifications on an electronic device.

FIG. 4 is an illustration of example method 400 to detect and repair suspicious memory modifications on an electronic device. In step 410, the resources of an electronic device may be scanned for suspicious memory modifications that may comprise malware. In one embodiment, step 410 may further comprise the step of scanning portions of memory of an electronic device known to be modified by malware, including but not limited to: interrupt descriptor tables; kernel data structures; user mode data structures; arbitrary memory code sections, data sections, or pages; kernel mode system dispatch table entries; and/or user mode function names and related hosting modules. For example, if a function points to an unrecognized location, monitor 102 may be configured to determine that such a memory modification is suspicious. Step 410 may be implemented by the use of a memory rule. Step 410 may comprise the steps 420-430.

In step 420, a code section of a system executable in the memory of the electronic device may be compared against known values of the code section. In one embodiment, the image of the system executable as it exists on the electronic device may be compared against a known image of the system executable. The comparison may be accomplished by comparing a digital signature or hash. In one embodiment, the functions, data structures, pointers, or other elements of code sections in memory may be examined for unfamiliar values. In such an embodiment, a memory rule may provide a known set of values by which the code section may be compared. If a memory modification matches known values, then the memory modifications may not be determined to be suspicious. If a memory modification does not match known values, the memory modification may be determined to be suspicious.

In step 430, a data section in the memory of the electronic device may be compared against known values of the data section. In one embodiment, the functions, data structures, pointers, or other elements of data sections in memory may be examined for unfamiliar values. In such an embodiment, a memory rule may provide a known set of values by which the data section may be compared. If a memory modification matches known values, then the memory modifications may not be determined to be suspicious. If a memory modification does not match known values, the memory modification may be determined to be suspicious.

In step 440, the suspicious memory modifications on the electronic device may be compiled. Identifying information concerning the memory modification may be noted. In one embodiment, the modified entry's location, the modified entry's value, information about the code section pointed to by a pointer, and/or information about a module pointed to by a pointer may be collected. The identity of the electronic device, as well as its network and region may be noted with information concerning the suspicious memory modifications.

In step 450, the suspicious memory modification information may be sent to a server for an evaluation of whether the memory modifications comprise a malware infection. In step 460, the evaluations of the suspicious memory modifications may be received. Some suspicious memory modifications may have been determined to not comprise a malware infection. Such memory modifications may be left undisturbed on the electronic device. Some suspicious memory modifications may have been determined to comprise a malware infection. In step 470, such memory modifications may be repaired. In one embodiment, a repair driver received from the reputation sever may be employed to fix the malware infection in the memory of the electronic device. In another embodiment, instructions for repairing memory may be received and thus carried out.

Figure 5:
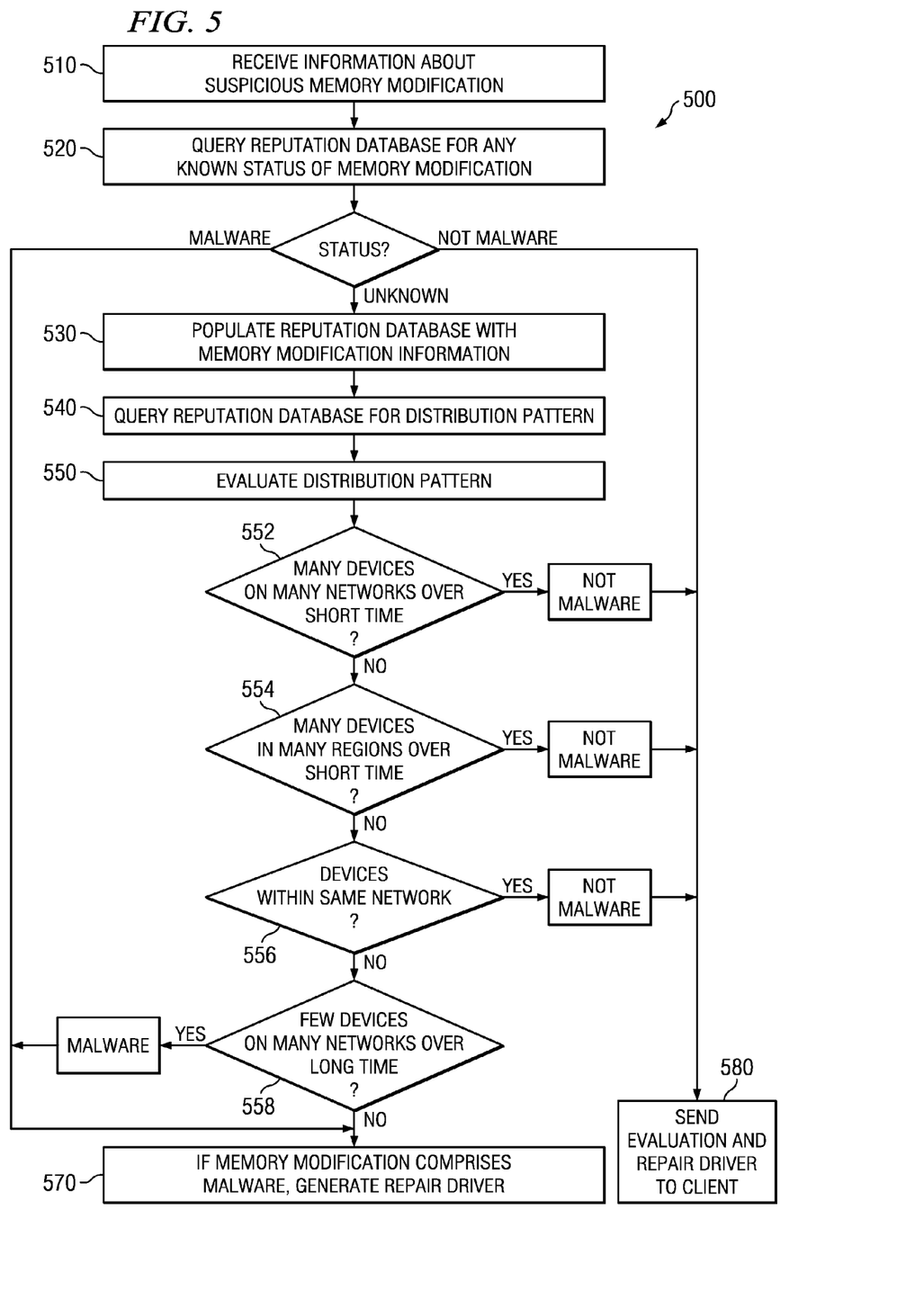
FIG. 5 is an illustration of example method to evaluate suspicious memory modifications as to whether they comprise a malware infection.

FIG. 5 is an illustration of example method 500 to evaluate suspicious memory modifications as to whether they comprise a malware infection. In step 510, information about a suspicious memory modification may be received. The information may include identifying information about the memory modification, as well as information about the device, network, and/or region where it was found.

In step 520, a reputation database may be queried to determine if the malware status of the memory modification is known. In one embodiment, step 520 may be implemented by examining a whitelist and/or a blacklist. If the memory modification is known to not comprise malware, step 580 may be executed next. If the memory modification is known to comprise a malware infection, step 570 may be executed next. If the memory modification is unknown (neither known to be safe or comprise malware), then the status of the memory modification may be determined in step 530.

In step 530, the reputation database may be populated with information received about the memory modification. In step 540, the reputation database may be queried for the distribution pattern of the memory modification. The distribution pattern may include information about the number and timing of memory modifications reported on different devices, networks, and/or regions.

In step 550, the distribution pattern may be evaluated to determine whether or not the memory modification comprises a malware infection. Steps 552-558 illustrate example embodiments of steps to evaluate the distribution pattern. In step 552, if the memory modification has appeared on a relatively high number of devices, on a relatively high number of networks, in a relatively short period of time, the memory modification may be determined to not comprise a malware infection. In step 554, if the memory modification has appeared on a relatively high number of devices, in a relatively high number of regions, in a relatively short period of time, the memory modification may be determined to not comprise a malware infection. In step 556, if the memory modification has appeared on devices all within the same network, sub-network, domain or subdomain, then the memory modification may be determined to not comprise a malware infection. In step 558, if the memory modification has appeared on a relatively few number of devices on a relatively high number of different networks and/or regions, over a relatively long period of time, then the memory modification may be determined to comprise a malware infection.

If no pattern is sufficiently recognized to determine that a memory modification does or does not comprise a malware infection, then the status of the memory modification may be undetermined. The reputation database will continue to track such memory modifications in subsequent submissions from the monitor until such time when a pattern may be used to establish the nature of the memory modification. The status of the memory modification may be stored in the reputation database. In one embodiment, a newly determined status of a memory modification may be stored in a whitelist or a blacklist.

In step 570, if a memory modification has been determined to comprise a malware infection, then a repair driver may be generated. The repair driver may allow a client to repair the memory of the electronic device to remove the modification. In one embodiment, instructions for removal of the memory modification, or other cleaning instructions, may be determined.

In step 580, the evaluation of the memory modification, as well as any repair drivers or instructions may be sent to a client for further use on the electronic device.

Methods 400 and 500 may be implemented using the system of FIGS. 1-3, or any other system operable to implement methods 400 and 500. As such, the preferred initialization point for methods 400 and 500 and the order of the steps comprising methods 400 and 500 may depend on the implementation chosen. In some embodiments, some steps may be optionally omitted, repeated, or combined. In some embodiments, some steps of method 400 may be accomplished in method 500, and vice-versa. In some embodiments, methods 400 and 500 may be combined. In certain embodiments, methods 400 and 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory and/or other non-transitory media; as well as communications media such wires, optical fibers, and other electromagnetic and/or optical carriers; and/or any combination of the foregoing.

Although the present disclosure has been described in detail, it should be Understood that various changes, substitutions, and altercations can be made hereto without departing from the spirit and the scope of the disclosure as defined by the appended claims.

What is claimed is:

1. A method for detecting malware memory infections, comprising the steps of:
    scanning a memory on an electronic device, the memory comprising memory vulnerable to memory modifications caused by malware;
    determining a suspicious entry present in the memory, the suspicious entry not recognized as a safe entry, the suspicious entry comprising a modification to an existing entry in memory;
    accessing information about the suspicious entry from a reputation system, the reputation system configured to store information on suspicious entries; and
    evaluating whether the suspicious entry indicates a malware memory infection, wherein the evaluation is based upon historical data regarding the suspicious entry, comprising:
        comparing the distribution pattern of the suspicious entry against a known distribution pattern, the known distribution pattern indicating a safe memory modification or indicating a malware memory infection;
        comparing a determined quantity of devices for which the suspicious entry has been reported against an upper threshold;
        comparing the time range of the determined quantity of devices against a lower threshold; and
    determining that the suspicious entry does not indicate a malware memory infection if the determined quantity of devices exceeds the upper threshold and the time range of the determined quantity of devices is less than the lower threshold.

2. The method of claim 1, further comprising the step of adding a suspicious entry data to a whitelist, wherein the evaluation is that the suspicious entry does not indicate a malware memory infection.

3. The method of claim 1, further comprising the step of adding information concerning suspicious entry to the reputation system, wherein the evaluation is that it is unknown whether the suspicious entry indicates a malware memory infection.

4. The method of claim 1, further comprising the step of adding suspicious entry to a blacklist, wherein the evaluation is that the suspicious entry indicates a malware memory infection.

5. The method of claim 1, further comprising the step of cleaning the electronic device of a malware memory infection, wherein the evaluation is that the suspicious entry indicates a malware memory infection.

6. The method of claim 5, wherein cleaning the electronic device of a malware memory infection comprises repairing the memory of the electronic device.

7. The method of claim 1, further comprising the step of generating a repair driver for the electronic device, wherein the evaluation is that the suspicious entry indicates a malware memory infection.

8. The method of claim 1, wherein evaluating whether the suspicious entry indicates a malware memory infection further comprises:
    determining a range of networks from which the suspicious entry has been reported; and
    if the suspicious entry has been reported from a single network, determining that the suspicious entry does not comprise a malware infection.

9. The method of claim 1, further comprising the step of sending information concerning unrecognized values associated with the suspicious entry to the reputation system.

10. The method of claim 9, further comprising the step of sending information identifying the electronic device to the reputation system.

11. A method for detecting malware memory infections, comprising the steps of:
    scanning a memory on an electronic device, the memory comprising memory vulnerable to memory modifications caused by malware;
    determining a suspicious entry present in the memory, the suspicious entry not recognized as a safe entry, the suspicious entry comprising a modification to an existing entry in memory;

accessing information about the suspicious entry from a reputation system, the reputation system configured to store information on suspicious entries; and evaluating whether the suspicious entry indicates a malware memory infection, wherein the evaluation is based upon historical data regarding the suspicious entry, comprising:

comparing the distribution pattern of the suspicious entry against a known distribution pattern, the known distribution pattern indicating a safe memory modification or indicating a malware memory infection;

comparing a determined quantity of devices for which the suspicious entry has been reported against a lower threshold;

comparing the time range of the determined quantity of devices against an upper threshold; and determining that the suspicious entry indicates a malware memory infection if the determined quantity of devices is less than the lower threshold and the time range of the determined quantity of devices exceeds the upper threshold.

12. An article of manufacture, comprising:
a non-transitory computer readable medium; and
computer-executable instructions carried on the non-transitory computer readable medium, the instructions readable by a processor, the instructions, when read and executed, for causing the processor to:

scan a memory on an electronic device, the memory comprising memory vulnerable to memory modifications caused by malware;

determine a suspicious entry present in the memory, the suspicious entry not recognized as a safe entry, the suspicious entry comprising a modification to an existing entry in memory;

access information about the suspicious entry from a reputation system, the reputation system configured to store information on suspicious entries; and evaluate whether the suspicious entry indicates a malware memory infection, wherein the evaluation is based upon historical data regarding the suspicious entry, comprising:

comparing the distribution pattern of the suspicious entry against a known distribution pattern, the known distribution pattern indicating a safe memory modification, or indicating a malware memory infection;

comparing a determined quantity of devices for which the suspicious entry has been reported against an upper threshold;

comparing the time range of the determined quantity of devices against a lower threshold; and determining that the suspicious entry does not indicate a malware memory infection if the determined quantity of devices exceeds the upper threshold and the time range of the determined quantity of devices is less than the lower threshold.

13. The article of claim 12, wherein the processor is further caused to add the suspicious entry's information to a whitelist, wherein the evaluation is that the suspicious entry does not indicate a malware memory infection.

14. The article of claim 12, wherein the processor is further caused to add information concerning the suspicious entry to the reputation system, wherein the evaluation is that it is unknown whether the suspicious entry indicates a malware memory infection.

15. The article of claim 12, wherein the processor is further caused to add the suspicious entry's information to a blacklist, wherein the evaluation is that the suspicious entry indicates a malware memory infection.

16. The article of claim 12, wherein the processor is further caused to clean the electronic device of a malware memory infection, wherein the evaluation is that the suspicious entry indicates a malware memory infection.

17. The article of claim 12, wherein causing the processor to clean electronic device of a malware memory infection comprises causing the processor to repair the memory of the electronic device.

18. The article of claim 12, wherein the processor is further caused to generate a repair driver for the electronic device, wherein the evaluation is that the suspicious entry indicates a malware memory infection.

19. The article of claim 12, wherein causing the processor to evaluate whether the suspicious entry indicates a malware memory infection further comprises causing the processor to:

determine a range of networks from which the suspicious entry has been reported; and if the suspicious entry has been reported from a single network, determine that the suspicious entry does not comprise a malware infection.

20. The article of claim 12, wherein the processor is further caused to send information concerning unrecognized values associated with the suspicious entry to the reputation system.

21. The article of claim 20, wherein the processor is further caused to send information identifying the electronic device to the reputation system.

22. An article of manufacture, comprising:
a non-transitory computer readable medium; and
computer-executable instructions carried on the non-transitory computer readable medium, the instructions readable by a processor, the instructions, when read and executed, for causing the processor to:

scan a memory on an electronic device, the memory comprising memory vulnerable to memory modifications caused by malware;

determine a suspicious entry present in the memory, the suspicious entry not recognized as a safe entry, the suspicious entry comprising a modification to an existing entry in memory;

access information about the suspicious entry from a reputation system, the reputation system configured to store information on suspicious entries; and evaluate whether the suspicious entry indicates a malware memory infection, wherein the evaluation is based upon historical data regarding the suspicious entry, comprising:

comparing the distribution pattern of the suspicious entry against a known distribution pattern, the known distribution pattern indicating a safe memory modification, or indicating a malware memory infection;

comparing a determined quantity of devices for which the suspicious entry has been reported against a lower threshold;

comparing the time range of the determined quantity of devices against an upper threshold; and determining that the suspicious entry indicates a malware memory infection if the determined quantity of devices is less than the lower threshold and the time range of the determined quantity of devices exceeds the upper threshold.

23. A system detecting malware memory infections, comprising:
a monitor, the monitor configured to:
scan a memory on an electronic device, the memory comprising memory vulnerable to memory modifications caused by malware
determine a suspicious entry present in the memory, the suspicious entry not recognized as a safe entry, the suspicious entry comprising a modification to an existing entry in memory; and
send information about the suspicious entry to a reputation system configured to access information about the suspicious entry in a reputation database configured to store information on suspicious entries; and
determine, based on information from the reputation system, whether the suspicious entry indicates a malware memory infection based upon historical data regarding the suspicious entry, comprising:
comparing the distribution pattern of the suspicious entry against a known distribution pattern, the known distribution pattern indicating a safe memory modification, or indicating a malware memory infection;
comparing a determined quantity of devices for which the suspicious entry has been reported against an upper threshold;
comparing the time range of the determined quantity of devices against a lower threshold; and
determining that the suspicious entry does not indicate a malware memory infection if the determined quantity of devices exceeds the upper threshold and the time range of the determined quantity of devices is less than the lower threshold.

24. The system of claim 23, wherein the reputation system is further configured to add the suspicious entry's information to a whitelist, wherein the evaluation is that the suspicious entry does not indicate a malware memory infection.

25. The system of claim 23, wherein the reputation server is further configured to add information concerning the suspicious entry to the reputation database, wherein the evaluation is that it is unknown whether the suspicious entry indicates a malware memory infection.

26. The system of claim 23, wherein reputation system is further configured to add the suspicious entry's information to a blacklist, wherein the evaluation is that the suspicious entry indicates a malware memory infection.

27. The system of claim 23, wherein the monitor is further configured to clean the electronic device of a malware memory infection, wherein the evaluation is that the suspicious entry indicates a malware memory infection.

28. The system of claim 27, wherein configuring the monitor to clean electronic device of a malware memory infection comprises configuring the monitor to repair the memory of the electronic device.

29. The system of claim 23, wherein the reputation system is further configured to generate a repair driver for the electronic device, wherein the evaluation is that the suspicious entry indicates a malware memory infection.

30. The system of claim 23, wherein configuring the reputation system to evaluate whether the suspicious entry indicates a malware memory infection further comprises configuring the reputation system to:
determine a range of networks from which the suspicious entry has been reported; and
if the suspicious entry has been reported from a single network, determine that the suspicious entry does not comprise a malware infection.

31. The system of claim 23, wherein the monitor is further configured to send information concerning unrecognized values associated with the suspicious entry to the reputation system.

32. The system of claim 31, wherein the monitor is further configured to send information identifying the electronic device to the reputation system.

33. A system detecting malware memory infections, comprising:
a monitor, the monitor configured to:
scan a memory on an electronic device, the memory comprising memory vulnerable to memory modifications caused by malware
determine a suspicious entry present in the memory, the suspicious entry not recognized as a safe entry, the suspicious entry comprising a modification to an existing entry in memory; and
send information about the suspicious entry to a reputation system configured to access information about the suspicious entry in a reputation database configured to store information on suspicious entries; and
determine, based on information from the reputation system, whether the suspicious entry indicates a malware memory infection based upon historical data regarding the suspicious entry, comprising:
comparing the distribution pattern of the suspicious entry against a known distribution pattern, the known distribution pattern indicating a safe memory modification, or indicating a malware memory infection;
comparing a determined quantity of devices for which the suspicious entry has been reported against a lower threshold;
comparing the time range of the determined quantity of devices against an upper threshold; and
determining that the suspicious entry indicates a malware memory infection if the determined quantity of devices is less than the lower threshold and the time range of the determined quantity of devices exceeds the upper threshold.

* * * * *